United States Patent [19]

Pilolla

[11] Patent Number: 5,755,262

[45] Date of Patent: *May 26, 1998

[54] ELECTRICALLY ACTUATABLE FAUCET HAVING MANUAL TEMPERATURE CONTROL

[76] Inventor: Joseph J. Pilolla, 853 Cedar Ave., Elmhurst, Ill. 60126

[*] Notice: The term of this patent shall not extend beyond the expiration date of Pat. No. 5,595,216.

[21] Appl. No.: 790,678

[22] Filed: Jan. 28, 1997

Related U.S. Application Data

[63] Continuation-in-part of Ser. No. 552,470, Nov. 9, 1995, which is a continuation-in-part of Ser. No. 385,778, Feb. 9, 1995, Pat. No. 5,595,216, which is a continuation of Ser. No. 167,734, Dec. 15, 1993, Pat. No. 5,397,099, which is a continuation-in-part of Ser. No. 40,835, Mar. 31, 1993, Pat. No. 5,358,213.

[51] Int. Cl.$^6$ ............................................. F16K 31/11
[52] U.S. Cl. ............................ 137/625.17; 251/129.03; 251/129.04
[58] Field of Search ................. 137/625.17; 251/129.04, 251/129.03

[56] References Cited

U.S. PATENT DOCUMENTS

| | | | |
|---|---|---|---|
| 2,623,545 | 12/1952 | Traynor | 251/129.03 |
| 2,768,790 | 10/1956 | Frey | 251/129.03 |
| 4,141,383 | 2/1979 | Geimer | 251/129.03 |
| 4,330,011 | 5/1982 | Moen | 137/625.17 |
| 4,681,141 | 7/1987 | Wang | 137/607 |
| 4,688,277 | 8/1987 | Kakinoki et al. | 4/623 |
| 4,709,728 | 12/1987 | Ying-Chung | 137/636.4 |
| 4,889,315 | 12/1989 | Imanaga | 251/129.03 |
| 4,914,833 | 4/1990 | Pilolla | 34/44 |
| 4,928,732 | 5/1990 | Hu | 251/129.04 |
| 4,962,790 | 10/1990 | Chou et al. | 137/607 |
| 5,050,641 | 9/1991 | Shwu-Fen | 137/607 |
| 5,062,164 | 11/1991 | Lee et al. | 251/129.04 X |
| 5,092,560 | 3/1992 | Chen | 251/30.03 |
| 5,358,213 | 10/1994 | Pilolla | 251/129.03 |
| 5,595,216 | 1/1997 | Pilolla | 137/625.17 X |

*Primary Examiner*—Stephen M. Hepperle
*Attorney, Agent, or Firm*—Dorn, McEachran, Jambor & Keating

[57] ABSTRACT

A faucet in which water is discharged by electrical actuation only and water temperature is controlled manually comprises a housing for connection to a water supply and a discharge spout. At least two inlets are formed in the housing for connection to hot and cold water supplies, and at least one outlet is formed in the housing for connection to the discharge spout. A single flow control valve mechanism is movable in a first direction to establish a flow path between the inlets and outlets or to block flow between the inlets and outlets, and in a second direction to expose the flow path to a desirable mix of hot and cold water from the hot and cold water supplies. An electrical actuation mechanism moves the valve mechanism in the first direction and a manual temperature control mechanism moves the valve mechanism in a second direction. The electrical actuation and manual temperature control mechanisms operate the valve mechanism independently of each other.

6 Claims, 5 Drawing Sheets

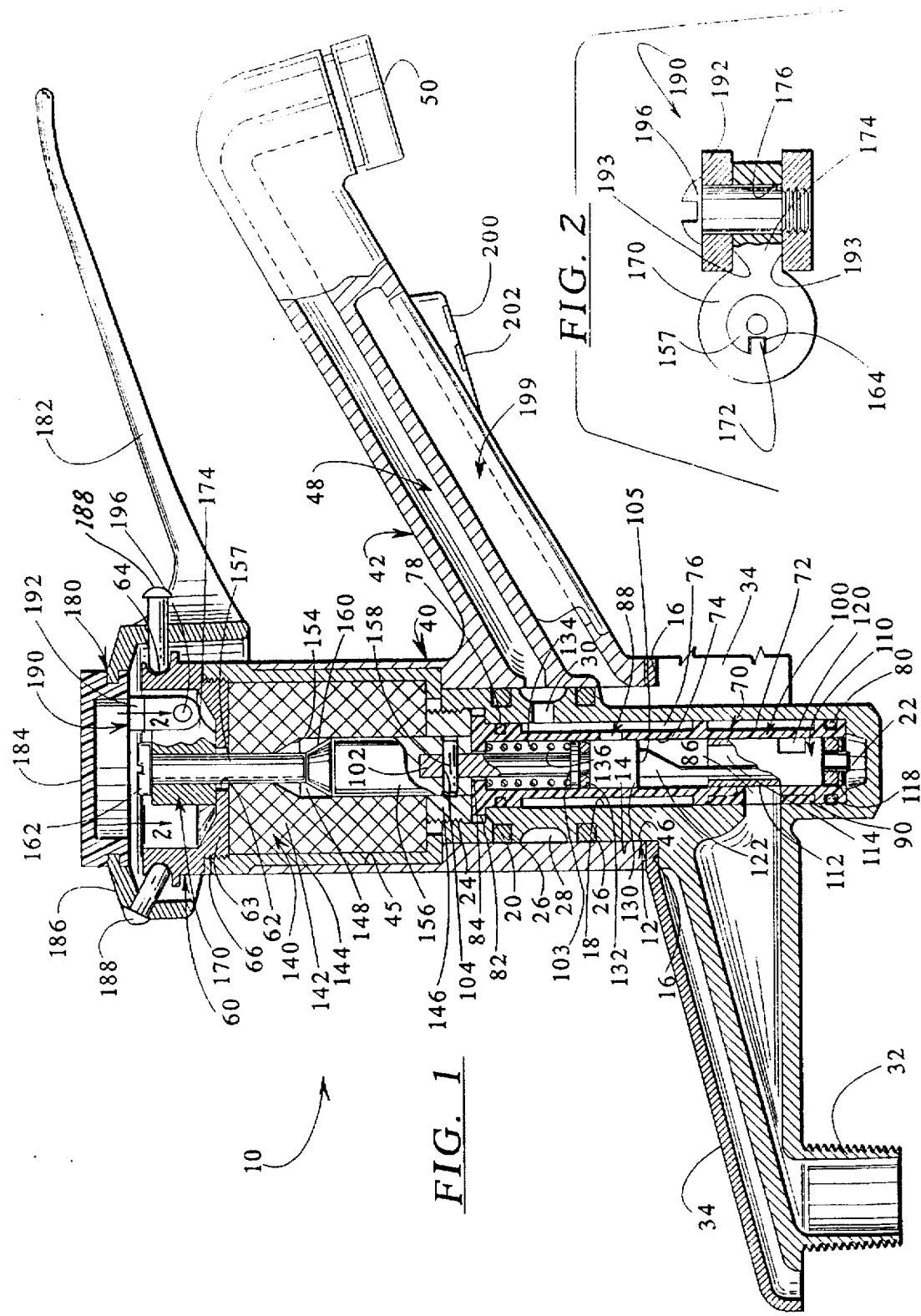

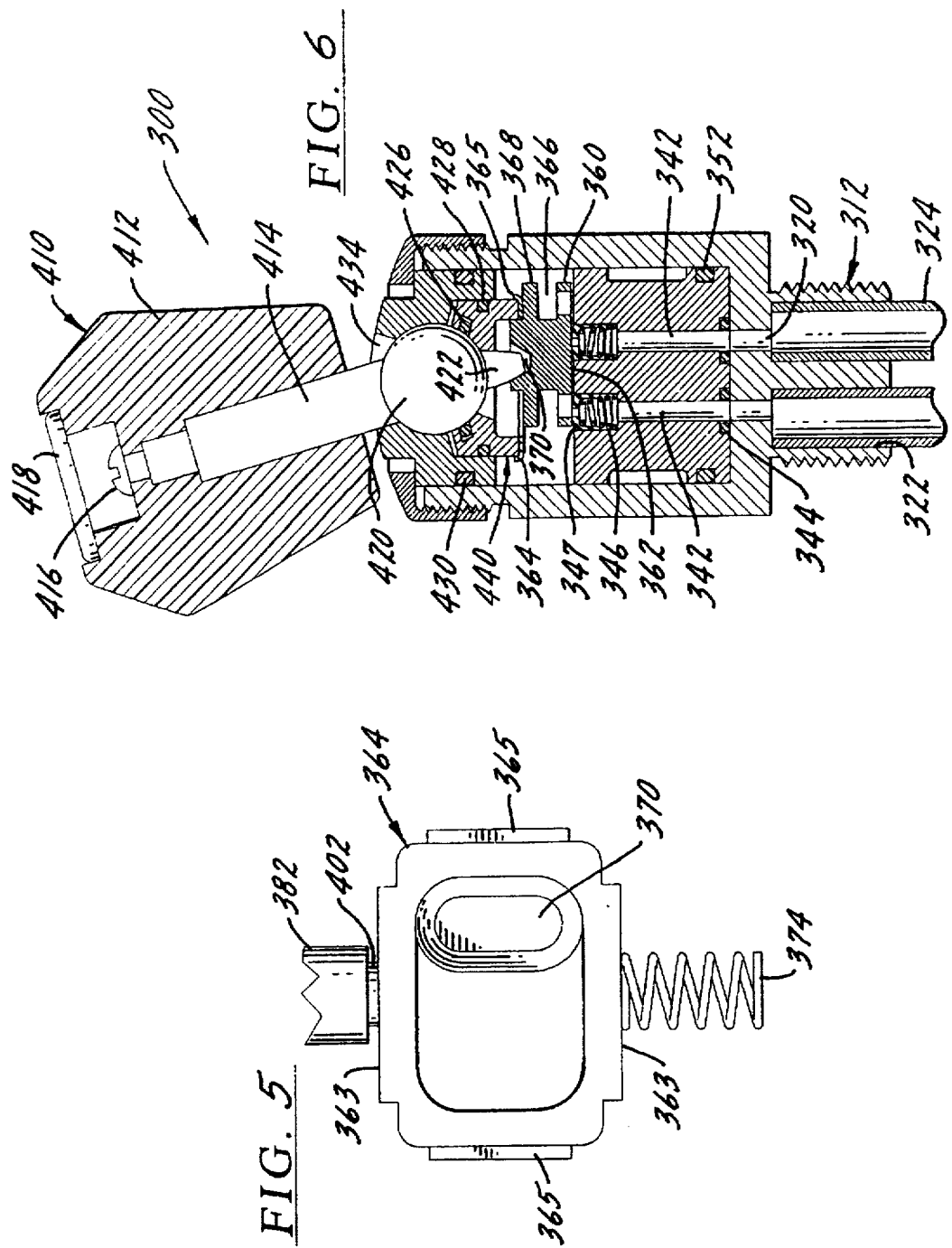

ELECTRICALLY ACTUATABLE FAUCET HAVING MANUAL TEMPERATURE CONTROL

This application is a continuation-in-part of U.S. patent application Ser. No. 08/552,470, filed Nov. 9, 1995, which is a continuation-in-part of U.S. patent application Ser. No. 08/385,778, filed Feb. 9, 1995, now U.S. Pat. No. 5,595,216, which is a continuation of application Ser. No. 08/167,734, filed Dec. 15, 1993, now U.S. Pat. No. 5,397,099, which is a continuation-in-part of application Ser. No. 08/040,835, filed Mar. 31, 1993, now U.S. Pat. No. 5,358,213. The disclosures of each of these parent applications is incorporated herein by reference.

BACKGROUND OF THE INVENTION

This invention relates to water faucets and more particularly to a faucet actuatable by electric operation only but having a manual temperature control. Representative prior art includes U.S. Pat. Nos. 4,141,383, 4,402,095, 4,608,277, 4,688,277, 4,762,273, 4,962,790, 5,050,641, 5,060,323 and 5,092,560. Previous faucets in this field of art have required complex valves and operating mechanisms, increasing the cost of manufacture and installation, and often leading to confusion and difficulty in operation.

Prior designs have used separate flow paths and valving and sometimes pilot valves. Separate valves associated with the temperature control mechanism and the faucet actuation mechanism have also been necessary. This increased complexity of design results in high cost of manufacture and installation.

SUMMARY OF THE INVENTION

The present invention provides a faucet in which discharge of water occurs by electrical actuation only and in which water temperature is manually controlled. It comprises a housing for connection to hot and cold water supplies and a discharge spout. At least two inlets are formed in the housing for connection to the water supply, and at least one outlet is formed in the housing for connection to the discharge spout. A single flow control valve mechanism is movable in a first direction to establish a flow path between the inlets and outlets, or to block flow between the inlets and outlets, and in a second direction to expose the flow path to a desirable mix of hot and cold water from the hot and cold water supplies. An electrical actuation mechanism operatively associated with the valve mechanism moves the valve mechanism in the first direction to control water flow, and a manual temperature control mechanism operatively associated with the valve mechanism moves the valve mechanism in the second direction to control temperature. The electrical actuation and manual temperature control mechanisms operate the valve mechanism independently of each other.

BRIEF DESCRIPTION OF THE DRAWINGS

FIG. 1 is a rotated sectional view of a faucet in a closed position which embodies the present invention;

FIG. 2 is a partial sectional view of the structure of FIG. 1 showing particular features of the invention;

FIG. 5 is a top view of part of a flow control valve housed in the faucet of FIG. 4;

FIG. 6 is a partial sectional view of the faucet of FIG. 4 in an open position and rotated ninety degrees.

DETAILED DESCRIPTION OF PREFERRED EMBODIMENTS

Figure 3:
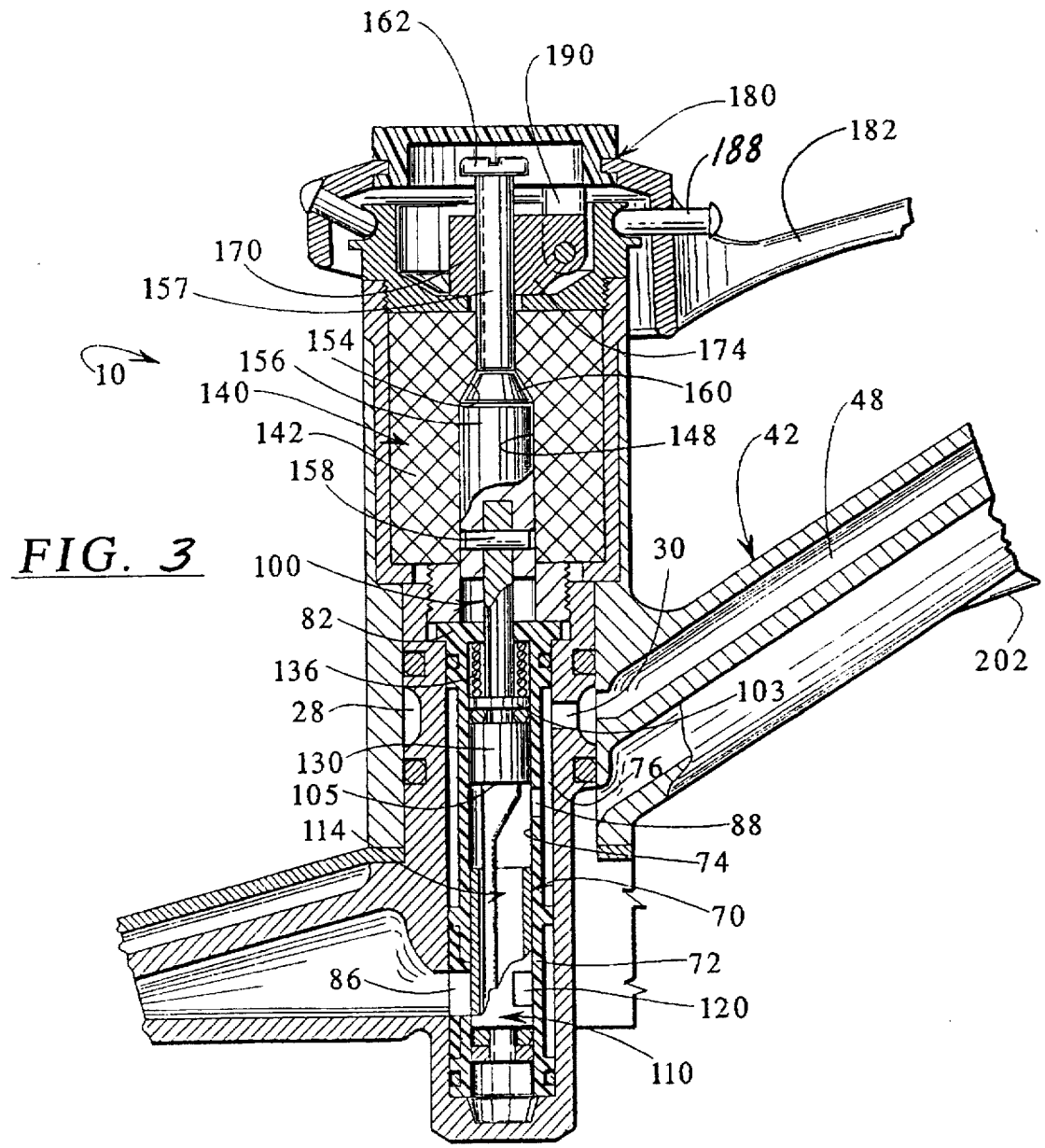
FIG. 3 is a sectional view of a portion of the faucet illustrated in FIG. 1 in an electrically actuated, open position.

A first faucet embodying the principles of the present invention is illustrated in FIGS. 1–3. Designated 10, the faucet body includes base or housing section 12, middle or spout section 40 and top section 60.

Base housing or section 12 is generally cylindrical. It includes an outer cylindrical surface 14 terminating in a shoulder 16 and has a central bore 18 extending between an upper annular shoulder 20 and bottom annular shoulder 22. The upper end of housing section 12 includes an enlarged threaded bore 24 above shoulder 20.

Outer cylindrical surface 14 includes spaces grooves in which are disposed elastomeric "O" ring seals 26. An annular relief or discharge channel 28 is provided between spaced "O" rings 26. A discharge passage 30 provides communication between central bore 18 and discharge channel 28.

Hot and cold water supply conduits permit attachment of hot and cold water supplies to housing section 12. One such inlet conduit is shown at 32. The other, not shown, is identical to inlet conduit 32 but is circumferentially displaced from the inlet illustrated.

A portion of base section 12 is covered by a decorative shell 34 which conceals inlet conduits 32. It rests on shoulder 16.

Middle section 40 includes a cylindrical portion and outwardly extending spout 42. The cylindrical portion has a lower annular end which rests on an upper surface of shell 34 to retain it upon shoulder 16 of base section 12.

The upper end of middle section 40 is open and defines a cylindrical cavity 45. A central bore 46 of slightly smaller diameter than cylindrical cavity 45 joins cavity 45 and forms an annular shoulder. Central bore 46 extends through the remainder of middle section 40 and defines a surface which surrounds outer cylindrical surface 14 of base section 12 in sealing engagement with "O" rings 26.

Spout 42 extends outward of middle section 40. It defines a passage or conduit 48 in communication with channel 28. Conduit 48 leads to a discharge nozzle 50 from which water exits the faucet during operation. Middle section 40 also houses electronic components associated with automatic operation of the faucet. It should be understood, however, that the electronic sensing device, which accomplishes automatic operation of the faucet, may be remote from the body of the faucet.

Top section 60 is generally cylindrical in shape. A hole 62 is formed in bottom wall 63 to provide communication with central cavity 45 of middle section 40. A groove 64 of semi-circular cross-section is formed upon the outer periphery of top section 60. Threads 66 are formed around a lower portion of the outer periphery of top section 60 for attachment with middle section 40.

A flow control and mixing valve, or cartridge mechanism 70 is disposed within central bore 18 of base section 12. The cartridge is of the "single lever" type. That is, a single operating lever actuates the valve and permits control of flow and water temperature. One commercially available valve cartridge is sold under the trademark "MOEN" by Stanadyne, Inc. of Cleveland, Ohio, a subsidiary of Standard Brands, Inc. Such a cartridge is illustrated in U.S. Pat. No. 4,330,011. Other similar cartridge valve mechanisms may be used without departing from the principles of the present invention.

Cartridge mechanism 70 includes longitudinal elongated cylindrical sleeve 72 having an internal bore 74. Sleeve 72 is of reduced diameter compared to bore 18 of base section 12 and defines an annular passage 76 with bore 18. Portions of sleeve 72 adjacent its upper and lower ends are enlarged and mate with bore 18 of base section 12 and defines an annular passage 76 with bore 18. Portions of sleeve 72 adjacent its upper and lower ends are enlarged and mate with bore 18. Grooves house "O" ring seals 78 and 80 to provide a fluid tight seal between bore 18 and sleeve 72.

Sleeve 72 includes an upper flange 82 which rests on upper shoulder 20 of base section 12 within threaded bore 24. A hole or passage 84 is formed through the center of flange 82 to provide communication between bore 74 of sleeve 72 and threaded bore 24 of base section 12.

Sleeve 72 includes spaced inlet ports, each one of which is in communication with one of the hot and cold water inlet conduits. One such port 86 is shown in association with inlet conduit 32. The other inlet port is identical, but circumferentially displaced from the port illustrated. Similarly, one or more outlet ports 88 extend through sleeve 72 and provide communication between internal bore 74 and annular passage 76.

Resilient seal members associated with each inlet conduit 32 are retained between bore 18 and sleeve 72. One such seal member 90 is shown. Each seal member includes a central aperture which extends through sleeve 72 and defines an inlet port 86.

Positioned within bore 74 is a longitudinally elongate and generally cylindrical reciprocal and rotatable valve member 100. It includes inlet control piston portion 110 and outlet closure portion 130 connected by hollow tubular member 122.

A reduced diameter stem 102 extends upwardly from outlet closure portion 130. Stem 102 extends through hole 84 in upper flange 82 of sleeve 72 into cavity 45 of middle section 40 of faucet body 10. A transverse hole 104 is provided in stem 102 for connection of valve member 100 to automatic actuation and manual temperature control mechanisms.

Inlet control piston portion 110 and outlet closure portion 130 define cylindrical surfaces in closely fitting relation to bore 74 of sleeve 72. While this relation is essentially fluid tight, grooves at the upper and lower ends of valve member 100 receive "O" ring seals 118 and 132 to assure containment of the water under pressure within flow control and mixing valve 70.

Cylindrical outlet closure portion 130 extends between upper annular seat 103 and a bottom edge 105 spaced from inlet control piston portion 110. A helical compression coil spring 136 is disposed between seat 103 and the undersurface of flange 82 of sleeve 72. Spring 136 biases axially movable valve member 100 toward the closed position illustrated in FIG. 1.

An upper portion of inlet control piston portion 110 includes wall 112 and defines a hollow internal annular cavity or chamber 114 within bore 74 of sleeve 72 surrounding hollow member 122. The axial extent of the cavity extends to edge 105 of outlet closure portion 130. A notch 120 is formed in the inlet control piston cylindrical wall which communicates with cavity 114.

Valve member 100 is axially movable between a closed position illustrated in FIG. 1 and an open position illustrated in FIG. 3. In the closed position notch 120 of inlet control piston portion 110 is disposed below fluid inlet ports 86. Edge 105 of outlet closure portion 130 is positioned below fluid outlet port 88. In this position the outer cylindrical surfaces of inlet control piston portion 110 and outlet closure portion 130 close, respectively, ports 86 and 88 and isolate inlet ports 86 from outlet port 88. Water is prevented from entering bore 74 of sleeve 72 through inlet ports 86. Communication of bore 74 with outlet port 88 is also blocked.

Upward axial movement of valve member 100 to the open position illustrated in FIG. 3 places notch 120 in communication with inlet ports 86 and raises edge 105 of outlet closure portion 130 above outlet; port 88. Chamber 114 provides communication between inlet ports 86 and outlet port 88. Water is free to flow through ports 86 and notch 120 into chamber 114 within bore 72. Water is further free to exit chamber 114 through outlet ports 88 into annular passage 76 which, in turn, communicates with nozzle 50 through discharge passage 30, discharge channel 28 and conduit 48.

Notch 120 in piston portion 110 is sized to communicate simultaneously with inlet ports 86 associated with hot and cold water inlet conduits 32. Valve member 100 is rotatable between extreme positions to permit communication of notch 110 with only the hot water inlet or only the cold water inlet. It may also be selectively positioned intermediate these extreme positions to provide a blend of hot and cold water for a desired temperature.

An electrically operated, automatic actuation mechanism in the form of electrical solenoid 140 is positioned within upper cylindrical cavity 45 of middle section 40. Solenoid 140 includes an annular coil assembly 142, a surrounding metal jacket 144 and an axially elongated, reciprocal metal armature 156. Coil assembly 142 defines a central bore 148 which receives armature 156. Bore 148 defines a frustoconical stop surface 154 which limits upward movement of armature 156.

Threaded base 146 of solenoid 140 is secured in threaded bore 24 of housing section 12. By this connection, upper flange 82 of flow control and mixing valve 70 is retained in position within housing section 12. Additionally, an annular, inwardly directed flange formed on solenoid jacket 144 is urged upon the shoulder of faucet body middle section 40. Middle section 40 is, in turn, urged against shoulder 16 of housing section 12. An upper threaded end of jacket 144 receives and retains threaded portion 66 of top section 60 to complete faucet body 10.

Armature 156 of the automatic actuation mechanism is attached to stem portion 102 of valve member 100 by a pin 158 which extends through armature 156 and hole 104 formed in stem 102. In this manner, armature 156 and valve member 100 are fixed for both axial and rotational movement.

Armature 156 includes a frusto-conical stop surface 160 which cooperates with stop surface 154 to limit upward axial movement of armature 156. Armature 156 includes upper extension 157 which extends through hole 62 in top section 60. The upper end of extension 157 includes a removable screw which defines an enlarged flange 162. An axially extending keyslot 164 is formed in upper extension 157.

The automatic actuation mechanism is controlled by electronic circuitry 199 located on the underside of spout 42 which supplies power to solenoid 140 in response to the presence of a user. Circuitry 199 includes an infra-red emitter 200 and an infra-red detector 202. Signals emitted from emitter 200 are reflected by a stimulus such as the hands of the user and are received by detector 202. Circuitry 199 is responsive to energize solenoid 140. Use of emitting and detecting means mounted on a faucet or remote from the faucet to detect a user's presence and energize a solenoid in response is well known. A suitable circuit arrangement is shown in U.S. Pat. No. 4,914,833.

Energization of solenoid 140 causes armature 156 to move from the closed position of FIG. 1 to the open position FIG. 3. Stop surface 160 of armature 156 abuts stop surface 154 of coil assembly 142. Notch 120 is placed in communication with inlet ports 86 which permits water to enter annular chamber 114. Edge 105 of outlet closure portion 130 is positioned above outlet port 88. Water entering chamber 114 passes through port 88 to nozzle 50.

Movement of armature 156 in response to energization of solenoid 140 compresses helical coil spring 136 between annular seat 103 on outlet closure portion 130 and the underside of flange 82. The compressed spring provides a restoring force which moves valve member 100 to a closed position on deenergization of the solenoid.

The manual temperature control mechanism takes the form of operating lever 180. It includes handle portion 182, integral cylindrical portion 186 and removable cap 184. Pins 188 extend through cylindrical portion 186 and are disposed in semi-circular groove 64 in top section 60 to prevent vertical, or up and down, movement of lever 180. Hence, faucet 10 may be electrically, but not manually, actuated. Pins 188 are movable horizontally within groove 64 to permit oscillation of lever 180 about the vertical axis of the faucet to control temperature.

Spaced depending arms 192 integral with cylindrical portion 186 form a yoke or shackle 190. Arm 192 includes aligned transverse holes, one of which is threaded. A best seen in FIG. 2, arms 192 define facing surfaces 193.

Cap 184 is a decorative piece and snaps into an appropriately formed opening in cylindrical portion 186. It is removable to permit access to the internal elements of the faucet.

Collar 170 surrounds upper extension 157 of armature 156. It defines a key 172, best seen in FIG. 2, disposed in keyslot 164 to fix collar 170 to extension 157 yet permit relative axial reciprocation of armature 156 during electric actuation of faucet 10.

Web 174 extends transversely from collar 170. It is secured between arms 192 of yoke 190 and includes a hole 176 aligned with the holes in the yoke arms. Screw 196 passes through the hole in one arm 192 and is threaded into the threaded hole of the other arm. It passes through hole 176 in web 174 of collar 170 to secure the yoke and collar for relative pivotal operation.

Manual temperature control is effected through operation of lever 180. Oscillation of lever 180 about the faucet vertical axis causes pins 188 to slide within groove 64 in top section 60. Collar 170 rotates about the vertical axis and the connection of key 172 with keyslot 164 imparts rotational movement to armature extension 157. The pin connection of armature 156 to valve member stem 102 similarly causes valve member 100 to rotate within sleeve 72. Such rotation orients notch 120 relative to the hot and cold water inlet ports 86 to provide proportional mixing of the hot and cold water supplies. The temperature of water is set by the user in this manner. Appropriate stops may be provided to limit rotational movement of the manual temperature control mechanism.

There is, in essence, a lost motion relationship between collar 170 and the linkage of upper extension 157, armature 156 and stem 102. This lost motion relationship isolates the manual temperature control mechanism from the flow control valve during automatic actuation. During automatic actuation (FIG. 3) the magnetic flux field of solenoid 140 causes upward movement of armature 156 until stop surface 160 of armature 156 seats against stop surface 154 in bore 148. Such movement permits upper extension 157 to move relative to key 172 without disturbing collar 170. Valve member 100 moves independently of the manual temperature control mechanism.

A second faucet embodying the principles of the present invention is designated 300 in FIGS. 4-7. Faucet 300 includes a generally cylindrical base or housing 312. Housing 312 has an open-ended cylindrical chamber 314 defined by an open top end 316, an inner cylindrical wall 317, and a floor or bottom surface 318. Chamber 314 houses inlet/outlet element 340, control disc 360, and operating stem elements to be described herein.

Two inlets 320 (FIG. 6) are defined in housing 312 and extend from bottom surface 318 of chamber 314. Inlets 320 lead to larger diameter water supply receptacles 322 which receive hot and cold water supply pipes 324.

The exterior of housing 312 includes threads formed around its upper and lower portions. Upper threads 326 permit attachment of a tightening cap or bonnet, and lower threads 328 permit attachment of faucet 300 to a sink or other fixture.

A spout 330 extends outward from housing 312. Spout 330 defines a passage or conduit 332 in communication with housing chamber 314. Conduit 332 leads to discharge nozzle 334 from which water exits the faucet during operation. A bore or opening is formed through housing 312 opposite spout 330 to permit attachment of an automatic actuation mechanism.

Inlet/outlet element 340 is fit into the lower portion of housing chamber 314 and rests on bottom surface 318. Element 340 defines two spaced inlet passages 342 extending completely through, from top to bottom of, element 340. When installed, inlet passages 342 are aligned with inlets 320 formed in housing 312. The bottom portions of inlet passages 342 are radially enlarged to define pockets or cavities which receive o-ring seals 344. O-rings 344 form a fluid seal between element 340 and bottom surface 318 of housing 312. The top portions of inlet passages 342 are also radially enlarged and define shoulders upon which rest seal bias springs 346 and rubber seals 347. Rubber seals 347 surround springs 346 and are open-ended to permit water to pass therethrough.

Element 340 further defines two outlet passages 348 which extend between the top of element 340 and an annular discharge channel 350 formed around the side of element 340. A cylindrical groove formed around the exterior of element 340 between discharge channel 350 and the bottom of element 340 receives 0-ring seal 352. Slots formed in the exterior of element 340 above discharge channel 350 receive stem retainer member 424, as will be described in more detail herein.

Control disc 360 is disposed within housing chamber 314 on top of inlet/outlet element 340. Control disc 360 has a planar lower surface 362 which engages rubber seals 347. Seals 347 are pressed against disc surface 362 by springs 346. Control disc 360 includes two communication ports 366 which extend between lower surface 362 and sidewalls 368 of disc 360. An elongated receptacle slot 370 is formed on the top surface of disc 360 (FIG. 5) for receiving gear tooth 422 which is associated with the manual temperature control mechanism (to be described herein).

Control disc 360 is seated beneath and carried by metal slide 364. Slide 364 has a pair of opposed downturned flanges 363 which engage opposite sides of disc sidewall 368 (FIGS. 4 and 7), and a pair of upturned flanges 365 which engage stem bearing member 440 (FIG. 6). Slide 364 facilitates movement of disc 360 by reducing friction between disc 360 and stem bearing member 440.

The manual temperature control mechanism takes the form of an operating stem 410 arrangement. Stem 410 includes an operating knob 412 surrounding an elongated lever 414. Knob 412 is secured to lever 414 by screw 416. A decorative cap 418 is snap-fitted to the top of knob 412 and conceals screw 416. Lever 414 extends to a ball 420 disposed within the top portion of faucet housing 312. Gear tooth 422 projects away from a side of ball 420 opposite lever 414 and is received by slot 370 of control disc 360.

Stem retainer member 424 surrounds ball 420 of operating stem 410 and secures control disc 360 in operative relationship between stem 410 and inlet/outlet element 340. A pair of legs 432 descend from retainer member 424. Each leg 432 includes at its lower end a rectangular foot which is matingly received by a corresponding slot formed in element 340 to secure retainer element 424 and stem 410 to element 340. A notch or opening 433 is formed through the upper end portion of each leg 432. A groove formed around an upper portion of retainer member 424 holds o-ring seal 430 to form a fluid seal between housing 312 and retainer member 424.

Retainer member 424 has an elongated slot 434 formed at its upper end through which lever 414 extends. Slot 434 serves as a guide for movement of lever 414 to control water temperature. Upper semi-spherical stem ball seat 436 is formed in the interior of retainer member 424 below slot 434.

Stem bearing member 440 is secured within and below retainer member 424 and provides a lower semi-spherical stem ball seat 442 for stem ball 420. Together, seats 436 and 442 provide a spherical enclosure within which ball 420 rotates during operation of the manual temperature control mechanism. O-ring 426 is secured in a groove formed in lower seat 442 and provides a fluid seal between ball 420 and bearing member 440. O-ring 428 is disposed in a groove formed in the middle exterior portion of bearing member 440 and provides a fluid seal between retainer member 424 and bearing member 440.

The lower portion of bearing member 440 is rectangular and includes opposing tabs 446 which extend into notches 433 formed in retainer member legs 432 to secure bearing member 440 underneath retainer member 424. The other opposing sides of the rectangular bottom portion of bearing member 440 define sidewalls which mate with upturned flanges 365 of metal slide 364 (FIG. 6). An opening 444 is formed in the center of the rectangular bottom portion of bearing member 440. Gear tooth 422 extends through opening 444 to engage control disc 360.

Cap or bonnet 425 is screwed around upper threads 326 of housing 312 and secures the aforesaid internal elements of faucet 300 within housing chamber 314 in their proper operative positions.

An automatic actuation mechanism in the form of an electrical solenoid 380 is mounted to housing 312 through the opening formed through housing 312 opposite spout 330 and through a corresponding opening formed through the adjacent retainer member leg 432. Plug 382 and O-ring seal 384 are interposed between housing 312 and solenoid 380 to prevent leakage of water from faucet 300.

Solenoid 380 includes an annular wire coil assembly 386 contained within a frame 388. Coil assembly 386 is comprised of wire coil 390 wound in the form of a helix and contained within an iron core 392. Bore 394 extends through assembly 386 and receives armature 396. A frusto-conical stop shoulder 398 is defined in the inner periphery of assembly 386.

Armature 396 is a ferromagnetic axially elongated reciprocal metal rod. It is mounted to ferromagnetic disc 400 at one end, and operatively associated with push rod 402 at its other end. Push rod 402 extends out of solenoid bore 394, through plug 382, and into housing chamber 314 to contact metal slide 364 which carries control disc 360. A frusto-conical stop surface 404 formed on armature 396 is cooperable with stop shoulder 398 of coil assembly 386 to limit the range of movement of armature 396. Contact of disc 400 against coil assembly 386 serves the same purpose.

Figure 4:
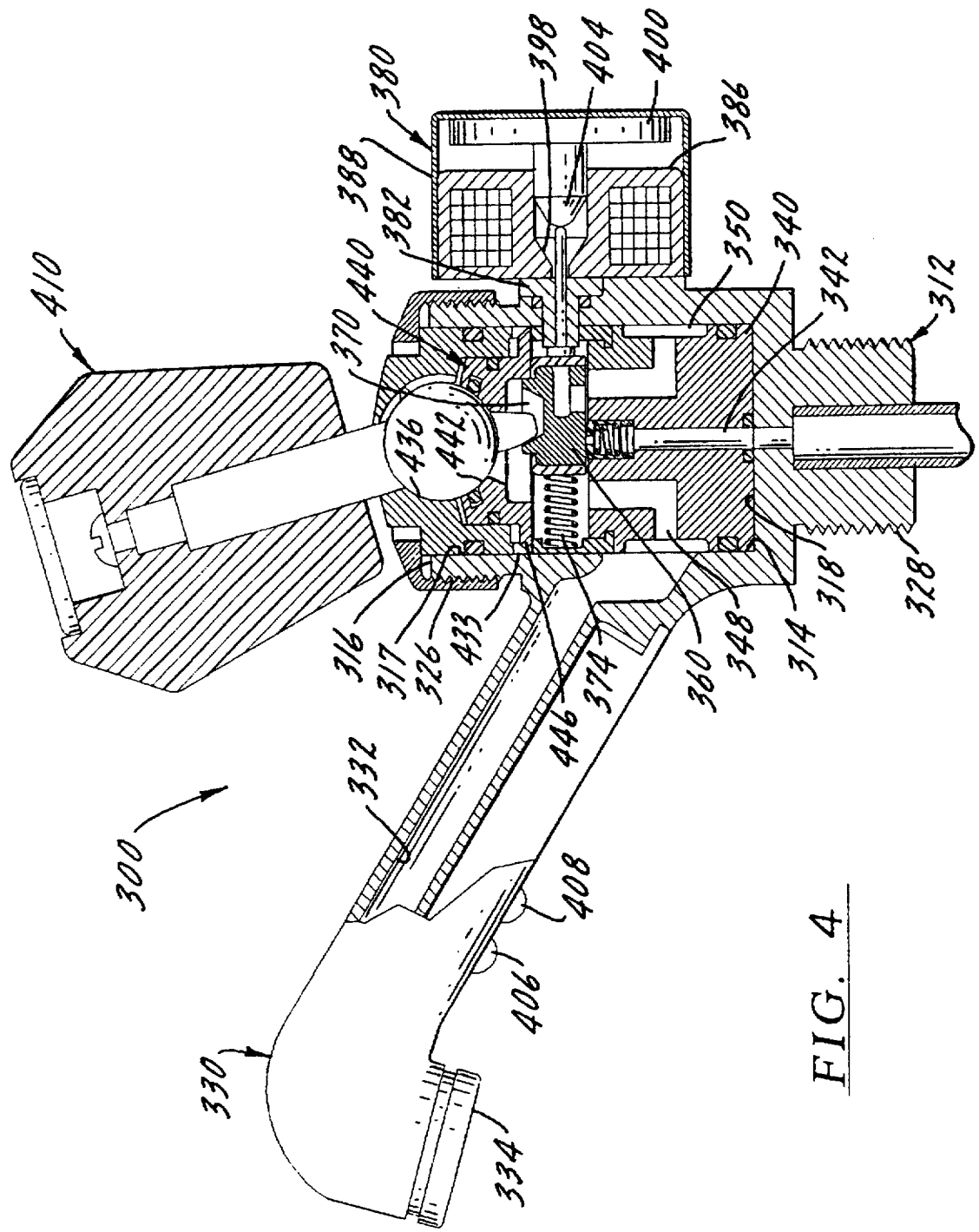
FIG. 4 is a partial sectional view of a second faucet in a closed position which embodies the present invention.

Helical compression coil spring 374 is mounted on the side of metal slide 364 opposite armature 380 between retainer member leg 432 and slide 364. Spring 374 urges slide 364 and control disc 360 away from leg 432 (FIG. 4).

Figure 7:
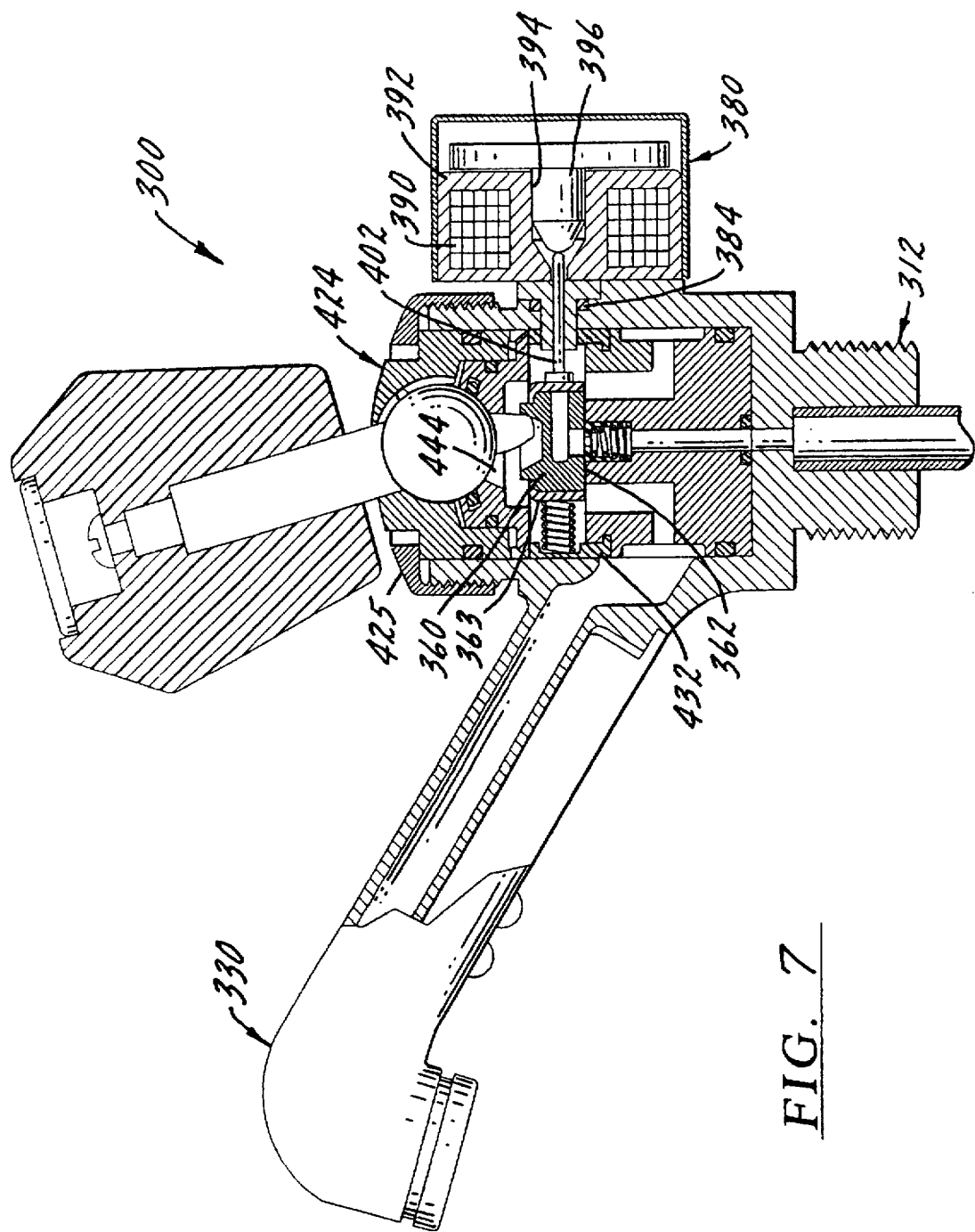
FIG. 7 is a partial sectional view of the faucet of FIG. 4 in an electrically actuated open position.

Control disc 360 is movable in a first direction between a closed position (FIG. 4) and an open position (FIG. 7). Spring 374 continuously urges disc 360 towards a closed position. In the closed position, lower surface 362 of disc 360 blocks or covers inlet passages 342. Spring loaded seals 347 seated at the tops of inlet passages 342 press against and form a fluid seal against surface 362. Water traveling from water supply pipes 324 through inlets 320 and inlet passages 342 is stopped from moving further through faucet 310, effectively shutting off the faucet.

Movement of disc 360 against spring 374 moves disc 360 towards an open position. In FIGS. 4 and 7, this is depicted as a "leftward" movement of disc 360. In a fully open position, lower disc surface 362 no longer blocks inlet passages 342, and ports 366 of disc 360 provide a fluid path between inlet passages 342 and outlet passages 348. Thus, in an open position, water may flow from water supply pipes 324, through inlets 320 and inlet passages 342, through disc ports 366, into outlet passages 348 and discharge channel 350, and exit faucet 300 through spout conduit 332 and discharge nozzle 334.

During movement in the first direction between open and closed positions, metal slide 364 moves with and carries control disc 360. Upturned flanges 365 slide against the sidewalls of stem bearing member 440 and pose no resistance to movement, while downturned flanges 363 contact disc sidewalls 368 and "push" disc 360 along.

Control disc 360 is movable in a second direction, normal to the first direction of movement between open and closed positions, to selectively align disc ports 366 with inlet passages 342 and thereby control the water temperature. Typically one of inlet passages 342 will be connected to a hot water supply and the other to a cold water supply. Disc 360 is movable in the second direction between extreme positions to permit water flow through only one of the inlets and thus, to provide either hot or cold water. This is illustrated in FIG. 6, where one of the inlet passages 342 is blocked while the other inlet passage is aligned with one of the disc ports 366. Disc 360 may be selectively moved between these extreme positions to permit simultaneous communication between both disc ports 366 and inlet passages 342 to provide any blend of hot and cold water desired.

During movement in the second direction, the engagement between upturned flanges 365 and the stem bearing member sidewalls prevents relative movement between metal slide 364 and bearing member 440. Thus, slide 364 remains fixed while control disc 360 slides smoothly between its downturned flanges 363.

Electrical solenoid 380 is responsible for automatic actuation of faucet 300. Faucet 300 is not manually actuatable. Armature 396 is movable between an unseated position and a seated position in response to magnetic forces exerted by coil assembly 386. In the unseated position, illustrated in FIG. 4, disc 400 is spaced from coil assembly 386 and stop surface 404 on armature 396 is spaced from stop shoulder 398 defined in coil assembly 386. In this position, push rod 402 extends out of plug 382 and into housing chamber 314 only slightly. In a seated position (FIG. 7), push rod 402 extends into chamber 314 a greater amount. Extension of armature 396 into chamber 314 is limited by seating of disc 400 against coil assembly 386 and stop shoulder 398 against stop surface 404.

Preferably, solenoid 380 is of the latching type. Latching solenoids suitable for use with the present invention are distributed by Liberty Controls Inc. of Shorewood, Ill. In a latching solenoid, permanent magnets are incorporated within the solenoid frame. When the armature is in an unseated position, the field exerted by these magnets has little effect on the armature. Upon application of an initial or latching pulse of power to the coil, a strong magnetic field is produced by the coil which moves the armature from an unseated to a seated position. In the seated position the permanent magnet field acts to latch or hold the armature in the place without further power being applied to the coil. In a typical solenoid, power must be continuously applied to the coil to hold the armature in the seated position.

The armature remains seated until a pulse of power having a polarity opposite to the polarity of the latching pulse is applied to the coil. When this occurs, a magnetic field is generated by the coil which opposes and cancels the holding effect of the permanent magnetic field. The armature is no longer held in a seated position and is free to be returned to an unseated position.

Solenoid 380 is operated by electronic circuitry which generates pulses appropriate to latch or unlatch solenoid 380 in response to the presence or absence of a user. The electronic circuitry includes an infrared emitter and detector mechanism mounted on the underside of spout 330. Infrared signals are continuously emitted from an emitter portion 406 defining a detection zone in which stimuli can be detected. When a stimulus, such as the hands of a user, enters the detection zone, the emitter signals are reflected back and received by a detector portion 408. Upon receipt of reflected signals a latching pulse is generated and applied to coil assembly 386 of solenoid 380 producing a magnetic field which moves armature 396 from an unseated position to a seated position.

As long as a stimulus is present in the detection zone, armature 396 is held in the seated position. When a stimulus is removed from the detection zone, reflections of emitted signals are no longer received by the detector portion. An unlatching pulse is generated and applied to coil assembly 386, producing a magnetic field which counteracts the latching field and releases armature 396 from the seated position.

Use of emitting and detecting means mounted on a faucet to detect a user's presence and energizing a solenoid in response is well known. A suitable circuit arrangement is shown in U.S. Pat. No. 4,914,333.

Since armature 396 is operatively associated with push rod 402, which in turn contacts metal slide 364, movement of armature 396 to a seated position in response to the presence of a stimulus in the detection zone causes reciprocal movement of control disc 360 to an open position as illustrated in FIG. 7. Disc ports 366 are placed in communication with inlet passages 342 permitting water flow through the faucet to outlet passages 348, discharge channel 350, and out discharge nozzle 334 through spout passage 332.

Movement of disc 360 in response to automatic actuation of faucet 300 compresses helical coil spring 374 between disc 360 and retainer member leg 432. During automatic actuation, the latching magnetic field exerted by coil assembly 386 overcomes the opposing spring force exerted by spring 374. Armature 396 is held in a seated position and disc 360 is held in an open position providing uninterrupted water flow. When a stimulus leaves the detection zone, solenoid 380 is unlatched, releasing armature 396 from its held position. The compressed spring 374 now provides a restoring force operative to return disc 360 to a closed position and armature 396 to an unseated position stopping water flow through faucet 310.

Water temperature during actuation of faucet 300 is manually controlled through manipulation of operating stem 410. Stem ball 420 is pivotably mounted within the spherical seat defined by upper ball seat 436 of retainer member 424 and lower ball seat 442 of bearing member 440. Thus, operating stem 410 may pivot through the movement of ball 420 within the spherical seat.

Slot 434, through which stem 410 extends, permits movement of stem 410 in only one direction—leftward and rightward as seen in FIG. 6—to control water temperature. As seen in FIGS. 4 and 7, stem 410 is restricted from movement in the opposing perpendicular direction. Hence, manual actuation of faucet 300 is not possible. In a typical mounting arrangement with faucet 300 behind a sink, and spout 330 extending over the sink and facing the user, side-to-side movement of stem 410 controls water temperature. Stem 410 is not movable towards or away from the user.

Movement of operating stem 410 leftward and rightward movement as seen in FIG. 3 is effective to control water temperature. This movement causes corresponding but opposite movement of gear tooth 422 through rotation of ball 420. This motion is effective to move disc 360 due to the disposition of tooth 422 within slot 370. By moving stem 410 in this manner, disc ports 366 may be aligned with inlet passages 342 in a manner appropriate to obtain a desired mix of hot and cold water.

There is, in essence, a lost motion relationship between gear tooth 422 of operating stem 410 and control disc 360. This relationship isolates the manual temperature control components from the control disc during automatic actuation. In automatic operation, the magnetic flux field of solenoid 380 causes movement of armature 396 until it reaches a seated position. Such movement translates through push rod 402 into movement of disc 360 to an open position. Gear tooth 422 simply slides within elongated slot 370 without moving. Hence, electrical faucet actuation occurs independently of manual temperature control. This relationship is best seen by comparing the relative positions of tooth 422 and slot 370 in FIGS. 4 and 7.

The lost motion relationship between control disc 360 and gear tooth 422 exists in the movement direction of electrical actuation (between open and closed positions) because of the elongation of slot 370 in that same direction. The same is not true for movement in the direction for water temperature control, however, as slot 370 is not elongated in the second direction. During movement in the second direction, disc 360 always moves with operating stem 410. There is no lost motion.

The present invention has been shown and described with reference two one faucet embodiments. The essence of this invention is a faucet in which water flow starts and stops by electrical actuation only, but in which water temperature is controlled manually. The electrical actuation and manual temperature control mechanisms remain isolated from each other during operation. Modification may be made to the specifically described embodiment without departing from the spirit and scope of the invention as represented by the following claims.

The faucet embodiments shown and described in the various parents of this application, for example, could also be modified to disable the manual actuation mechanism, thereby permitting faucet actuation by electrical means only, but allowing manual control of temperature.

I claim:

1. A faucet in which water discharges is discharged by electrical actuation only and water temperature is controlled manually comprising: a housing for connection to hot and cold water supplies; a discharge spout; at least two inlets formed in said housing for connection to said hot and cold water supplies; at least one outlet formed in said housing for connection to said discharge spout; a single flow control valve mechanism movable in a first direction to establish a flow path between said inlets and outlets or to block flow between said inlets and outlets and movable in a second direction to expose said flow path to a desirable mix of hot and cold water from said hot and cold water supplies; an electrical actuation mechanism operatively associated with said valve mechanism to move said valve mechanism in said first direction; and a manual temperature control mechanism operatively associated with said valve mechanism to move said valve mechanism in said second direction, said electrical actuation mechanism and said manual temperature control mechanism operating said valve mechanism independently of each other.

2. A faucet as claimed in claim 1 wherein said valve mechanism comprises a control disc seated above said inlets and outlets and having ports formed therethrough and a blocking portion, said control disc being movable by said electrical actuation mechanism in said first direction between an open position wherein said ports are in communication with said inlets to provide said flow path between said inlets and outlets, and a closed position wherein said blocking portion covers said inlets to block said flow path.

3. A faucet as claimed in claim 2 and further comprising biasing means disposed in said housing to continuously urge said control disc towards said closed position.

4. A faucet as claimed in claim 3 wherein said automatic actuation mechanism includes an electrical solenoid mounted to said housing and operatively associated with a push rod extending into said housing and contacting said control disc to urge said control disc towards an open position.

5. A faucet as claimed in claim 4 wherein said control disc includes an elongated receptacle slot formed in a top surface thereof, and said manual temperature control mechanism includes a gear tooth received in said receptacle slot to effect movement of said control disc in said second direction.

6. A faucet as claimed in claim 5 wherein said manual temperature control mechanism further comprises an operating stem including an elongated lever extending from one side of a ball, said gear tooth extending from an opposite side of said ball, said ball pivoting in said second direction within a spherical ball seat disposed within said housing.

* * * * *